United States Patent
Winter (10) Patent No.: US 10,228,246 B2
(45) Date of Patent: Mar. 12, 2019

(54) METHOD FOR CALIBRATING A MEASUREMENT DEVICE

(71) Applicant: Hilti Aktiengesellschaft, Schaan (LI)

(72) Inventor: Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 337 days.

(21) Appl. No.: 14/908,435

(22) PCT Filed: Jul. 29, 2014

(86) PCT No.: PCT/EP2014/066303
§ 371 (c)(1),
(2) Date: Jan. 28, 2016

(87) PCT Pub. No.: WO2015/014852
PCT Pub. Date: Feb. 5, 2015

(65) Prior Publication Data
US 2016/0169671 A1  Jun. 16, 2016

(30) Foreign Application Priority Data

Jul. 30, 2013 (EP) .................................. 13178525

(51) Int. Cl.
*G01C 15/00* (2006.01)
*G01S 7/497* (2006.01)
*G01C 25/00* (2006.01)

(52) U.S. Cl.
CPC ........... *G01C 15/00* (2013.01); *G01C 15/002* (2013.01); *G01C 25/00* (2013.01); *G01S 7/4972* (2013.01)

(58) Field of Classification Search
CPC ...................................................... G01C 15/00
See application file for complete search history.

(56) References Cited

U.S. PATENT DOCUMENTS

2013/0186871 A1* 7/2013 Suzuki .................. B23K 26/04
 219/121.77
2014/0104416 A1* 4/2014 Giordano ............... G01B 11/02
 348/135

FOREIGN PATENT DOCUMENTS

| DE | 10 2007 003 586 A1 | 8/2007 |
|---|---|---|
| EP | 2 348 331 A1 | 7/2011 |
| EP | 2 523 017 A1 | 11/2012 |
| EP | 2 527 866 A1 | 11/2012 |

(Continued)

OTHER PUBLICATIONS

PCT/EP2014/066303, International Search Report (PCT/ISA/210) dated Oct. 7, 2014, with partial English translation (Five (5) pages).

(Continued)

*Primary Examiner* — Robert R Raevis
(74) *Attorney, Agent, or Firm* — Crowell & Moring LLP (57) ABSTRACT

A method for calibrating a measurement device by a target object is disclosed. Prior to calibrating the measurement device the suitability of the target object is inspected by multiple evaluation criteria. The calibration of the measurement device by the target object is only performed if the target object meets all evaluation criteria. To evaluate the target object, a camera device takes an image of the target object without using a laser beam and an image of the target object with using a laser beam, with the images then evaluated by image processing and object identification procedures.

4 Claims, 5 Drawing Sheets

(56) References Cited

FOREIGN PATENT DOCUMENTS

EP          2 527 867  A1    11/2012

OTHER PUBLICATIONS

European Search Report issued in European counterpart application No. EP 13 17 8525 dated Feb. 5, 2014, with Statement of Relevancy (Eight (8) pages).

* cited by examiner

METHOD FOR CALIBRATING A MEASUREMENT DEVICE

This application claims the priority of International Application No. PCT/EP2014/066303, filed Jul. 29, 2014, and European Patent Document No. 13178525.5, filed Jul. 30, 2013, the disclosures of which are expressly incorporated by reference herein.

BACKGROUND AND SUMMARY OF THE INVENTION

The present invention relates to a method for calibrating a measurement device by means of a target object as well as a measurement device for performing such a method.

The term "calibrate" defines a measurement procedure in which the deviation between a first and a second dimension is determined and documented. The determined deviation is taken into account in the subsequent use of the measurement device for correction purposes.

Optical measurement devices comprise one or more laser measurement apparatuses, a camera device, and a control device, wherein the laser measurement apparatuses are designed as angle measuring devices or distance measuring devices. By means of optical measuring devices, angles, distances, and positions of target objects can be determined. The term "target object" includes all objects that reflect, scatter or reflect and scatter the striking laser beam.

When measuring natural targets, such as corners or edges of buildings, the measurement accuracy of the measuring devices depends largely on how exactly the target axis of the camera device and the measurement axis of the laser measuring device are arranged coaxially. The coaxial deviations of the measurement and target axis increase, the more moveable optical components a measurement device has. Camera devices with zoom lenses have a high optical resolution, yet simultaneously have an unstable target axis.

It is known for operators to check the coaxiality of the measurement and target axis of a measuring device, and if necessary, to manually correct it by means of adjusting elements. The manual adjustment by the operator is time-consuming.

The object of the present invention consists of developing an automatic method for calibrating a measurement device that can be performed without an operator intervening. In addition, a corresponding measuring device is to be developed for performing the calibration procedure.

In the method already mentioned for calibrating a measurement device according to the invention, this object is achieved by the features of the independent claim. Advantageous embodiments are indicated in the dependent claims.

According to the invention, the method for calibrating a measuring device, which has a laser measurement apparatus that emits a laser beam along a measurement axis, a camera device with a target axis, and a control device, comprises the following steps:

Taking a first image of a target object by means of the camera device, with the laser beam turned off,
Defining an image section around the target axis position, stored in the control device, in the first picture of the target object,
Determining a first contrast between the darkest image region of the image section and the brightest image region of the image section,
Comparing the first contrast against a first limit value stored in the control device,
Taking a second image of the target object, with the laser beam turned on, by means of the camera device, if the first contrast does not exceed the first limit value,
Determining a differential image between the first and second image of the target object,
Identifying a laser beam and a surrounding region in the differential image of the target object,
Determining a second contrast between the brightest image region of the surrounding region and the darkest image region of the laser beam,
Comparing the second contrast against a second limit value stored in the control device,
Determining a focal point of the laser beam and the focal point coordinates, if the second contrast does not fall below the second limit value, and
Storing the focus point coordinates of the laser beam as a new position of the target axis in the control device.

The method according to the invention has the advantage that the calibration of the measuring device is performed by means of the target object only when the target object meets two evaluation criteria. As the first evaluation criterion, the uniformity of the brightness of the target object is inspected by means of the first contrast, and as the second evaluation criterion, the difference in the brightness between the identified laser beam and the surrounding target objet is inspected using the second contrast.

The images of the target object are evaluated by means of known image processing and object identification procedures. The term "object identification" includes procedures for identifying a known object within an object space by means of optical, acoustic, or other physical detection procedures.

The contrast is a differentiating feature for the brightness trend of an image or the brightness difference between two image regions. As a physical measurement parameter for brightness, one uses the luminous intensity that is measured in candela or a comparable measurement parameter. For every pixel of the image sensor, the camera device provides a pixel value. The image region refers to the smallest unit of the image of the target object that is used for evaluating the target object within the scope of the method according to the invention. The image region may comprise a single pixel or multiple neighboring pixels. If the image regions each comprise one pixel, the pixel values of the individual pixels are compared in calculating the contrast; for image regions with multiple pixels, the pixel values are averaged into a measurement value and the averaged measurement values are subsequently compared.

The first contrast is defined by the difference between 1 and the ratio of the measurement values between the darkest image region (minimum measurement value) and the brightest image region (maximum measurement value) of the image section and is indicated as a percentage value. To limit the measurement error during calibration, the target object should have the most uniform surface structure possible, which is represented as uniform brightness in the image of the target object. The deviation of the image regions to the brightest image region of the image section must be less than a first limit value. The first limit value is for example 5%, i.e., all image regions of the image section have a deviation less than 5% in relation to the brightest image region. The first limit value is established beforehand and is stored in the control device.

After comparing the first contrast against the first limit value, the calibration procedure is discontinued if the first contrast exceeds the first limit value; the calibration procedure is only continued if the first contrast fails below, or does not exceed, the first limit value. If the first contrast of the image section exceeds the first limit value, the target object is not suited for calibrating the measurement device and the calibration procedure is discontinued. The measurement device may be switched by the control device from a calibration mode into a measurement mode; for additional measurements, one uses the position stored in the control device as the position of the target axis.

The second contrast is defined by the difference between 1 and the ratio of the measurement value between the brightest image region (maximum measurement value) of the surrounding region and the darkest image region (minimum measurement value) of the laser beam, and is indicated as a percentage value. To limit the measurement error during calibration, the laser beam should have a greater brightness in relation to the surrounding region. The difference between the image regions of the laser beam and the image regions of the surrounding region must be greater than a second limit value. The second limit value amounts to 10% for example, i.e., all image regions of the laser beam have at least a 10% higher luminous intensity than the image regions of the surrounding region. The second limit value is established beforehand and stored in the control device.

After comparing the second contrast against the second limit value, the calibration procedure is discontinued if the second contrast falls below the second limit value; the calibration procedure is only continued if the second contrast exceeds, or does not fall below, the second limit value. If the second contrast falls below the second limit value, the target object is unsuited for calibrating the measurement device and the calibration procedure is discontinued. The measurement device may be switched by the control device from a calibration mode into a measurement mode; for additional measurements, one uses the position stored in the control device as the position of the target axis.

A preferred development of the method according to the invention for calibrating a measurement device is characterized by the additional steps:

Performing a distance measurement to the target object and

Comparing the measured distance against a distance range stored in the control device.

The distance of the measurement device to the target object is an additional evaluation criterion that evaluates the quality of a target object for calibrating a measurement device. The distance measurement and the comparison against the distance range stored in the control device may be performed before the camera device takes the first image of the target object, after the first evaluation criterion was inspected, or after the second evaluation criterion was inspected.

In a particularly preferred manner, the calibration procedure is discontinued when the measured distance of the measurement device to the target object lies outside the stored distance range; the calibration procedure is only continued when the measured distance lies within the stored distance range. To limit the measurement error during calibration, the target object should be arranged within an established distance range. If the distance lies outside the distance range, the target object is unsuited for calibrating the measurement device and the calibration procedure is discontinued. For distances that lie above the distance range, there is the risk that the luminous intensity of the image regions within the laser beam is too low. The measurement device may be switched by the control device from a calibration mode into a measuring mode; for additional measurements, one uses the position stored in the control device as the position of the target axis.

To perform the procedure according to the invention for calibrating a measurement device, the measurement device comprises:

A laser measurement apparatus that emits a laser beam along a measurement axis,

A camera device with a target axis, and

A control device with a control element for controlling the laser device and the camera device, an evaluation element, and a storage element.

In a preferred development of the measurement device, the camera device has a camera lens, which is adjustable between a first and second focal length, wherein the storage element stores for the first focal length of the camera lens a first position of the target axis and said storage element stores for the second focal length of the camera lens a second position of the target axis. In a camera lens system with moveable lenses, the alignment of the target axis changes by moving the lenses. The measurement accuracy of a measurement device can be improved if the respective position of the target axis is stored for various focal lengths of the camera lens system.

In a particularly preferred manner, the camera lens system can be switched between more than two focal lengths, wherein the storage element stores a position of the target axis for every focal length of the camera lens system. The instability of the camera lens system and thus the instability of the target axis increase, the larger the mechanical adjustment range is for moveable lenses. The measurement accuracy of a measurement device can be improved if the respective position of the target axis is stored for various focal lengths.

Embodiments of the invention are hereinafter described using the drawing. It is intended to depict the embodiments not necessarily to scale; instead, the drawing, where helpful for explanation purposes, is executed in a schematic and/or slightly distorted form. In regard to amendments of teachings directly recognizable from the drawing, one shall refer to the relevant prior art. One shall thereby take into account that various modifications and changes regarding the form and detail of an embodiment may be undertaken, without deviating from the general idea of the invention. The features of the invention disclosed in the description, the drawing, as well as the claims may be essential individually per se as well as in any combination for the development of the invention. In addition, the scope of the invention includes all combinations of at least two features disclosed in the description, the drawing and/or the claims. The general idea of the invention is not restricted to the exact form or the detail of the preferred embodiment depicted and described below, or limited to a subject matter that would be restricted in comparison to the subject matter claimed in the claims. In regard to the given measurement ranges, values lying within the mentioned limits are to be disclosed as limit values, and are to be used and claimed as desired. For simplicity's sake, the same reference signs are used below for identical or similar parts, or for parts with an identical or similar function.

DETAILED DESCRIPTION OF THE DRAWINGS

Figure 1:
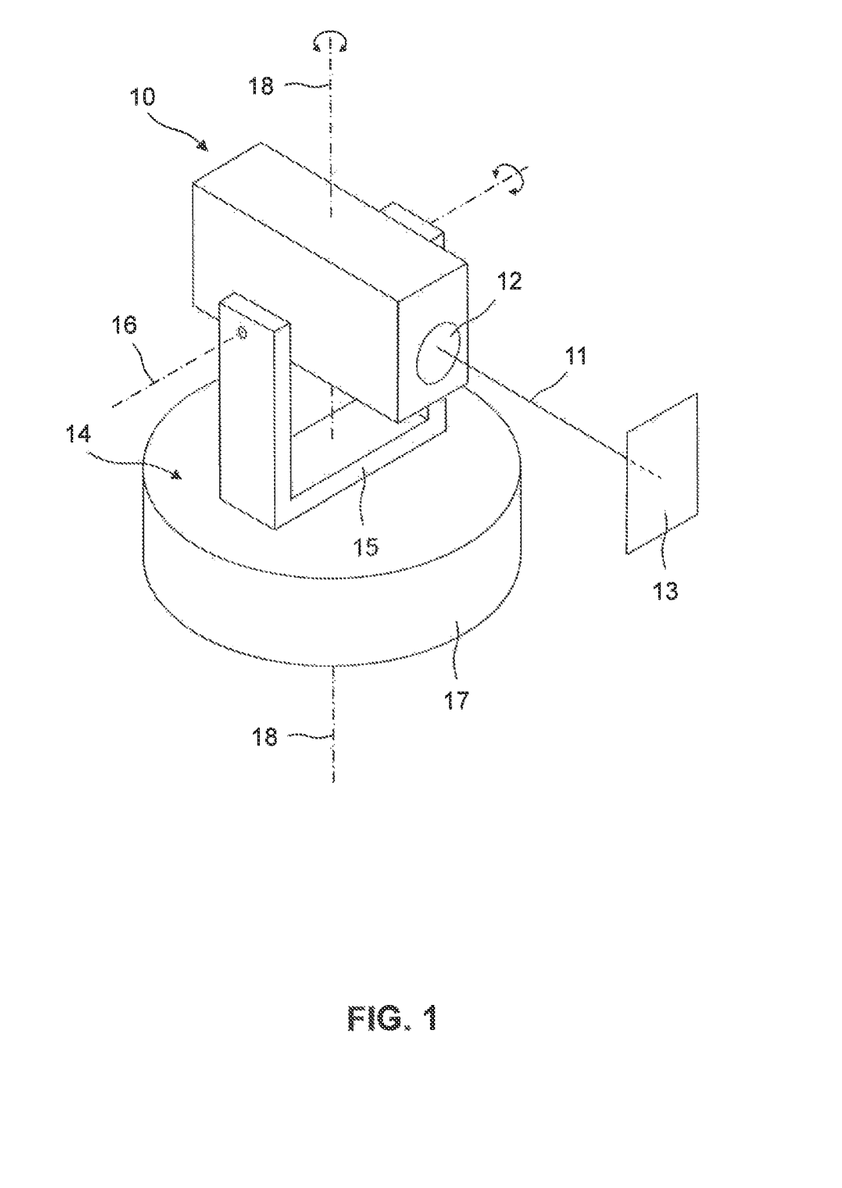
FIG. 1 depicts a measurement device for measuring target objects in a schematic view.

In a schematic view, FIG. 1 depicts an optical measurement device 10 for measuring target objects. In measurement device 10, there is generated a laser beam 11, which emerges out of measurement device 10 through a decoupling aperture 12 and is directed to a target object 13.

Measurement device 10 can be adjusted by means of an adjustment device 14 in several directions so that laser beam 11 can be directed at various target objects, which may differ for example in height and/or angular orientation. Measurement device 10 is seated in a U-shaped bearing element 15 and is adjustable relative to bearing element 15 about a horizontal tilting axis 16. Bearing element 15 is arranged on a tripod plate 17 and is rotatable relative to tripod plate 17 about a vertical rotational axis 18, so that target objects can be targeted in all angular positions. The tripod to which measurement device 10 is mounted is typically arranged in such a manner that tilting axis 16 is arranged perpendicular to the plumb line and rotational axis 18 is arranged parallel to the plumb line.

Figure 2:
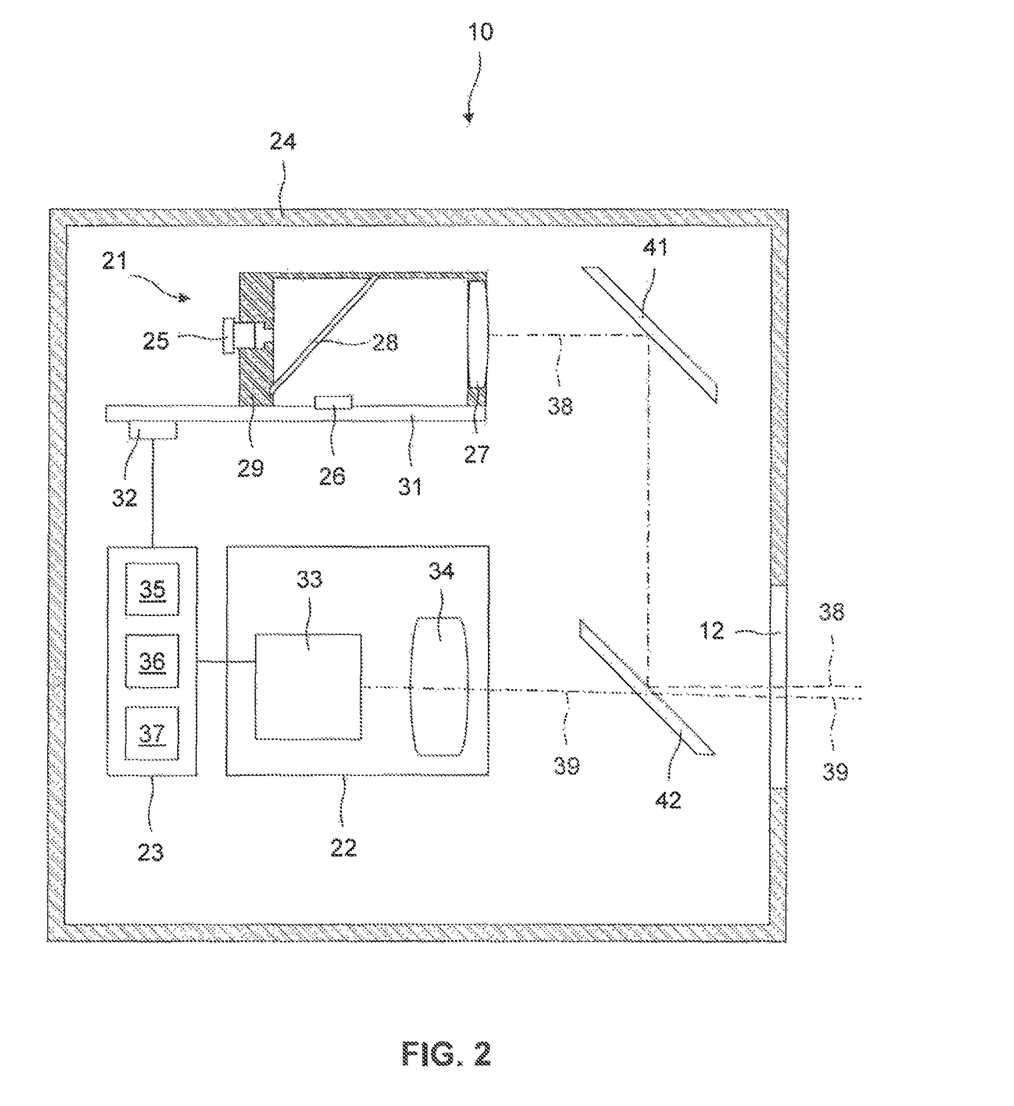
FIG. 2 depicts the measurement device of FIG. 1, which can be calibrated pursuant to the calibration procedure according to the invention, with a distance measurement device, a camera device, and a control device.

FIG. 2 depicts the essential components of measurement device 10, which can be calibrated pursuant to the method according to the invention. Measurement device 10 has a laser measurement apparatus 21, a camera device 22, and a control device 23. Components 21, 22, 23 of measurement device 10 may, as depicted in FIG. 2, be arranged in a shared device housing 24 or components 21, 22, 23, are arranged in multiple housing parts.

Laser measurement apparatus 21 is designed as a distance measurement device with a coaxial arrangement of the electrical-optical components (source beam and detector). Compared to paraxial arrangements in which the optical axes of the electrical-optical components run in a parallel offset manner, distance measurement devices with a coaxial arrangement of the electrical-optical components have the advantage of parallax-free performance, and are therefore better suited for use in measurement device 10. Distance measurement apparatus 21 comprises a first electrical-optical component designed as a beam source 25, a second electrical-optical component designed as a detector 26, a beam-shaping lens 27, a beam-splitting lens 28, a lens carrier 29, a circuit board 31 and a control element 32. For constructing a measurement device 10 with a high measurement accuracy, laser measurement apparatuses 21 that have a high degree of stability are particularly well suited. A stable distance measuring device with a coaxial arrangement of the electrical-optical components is described in detail in EP 2 527 866 and EP 2 527 867 A2.

Beam source 25 is designed as a laser diode, which generates a laser beam in the visible or infrared spectrum. Detector 26 is designed as a photo diode, wherein the properties of the photo diode are adjusted to laser diode 25. Control element 32 is connected to beam source 25 and detector 26, and determines the distance to target object 13 from a time difference between a reference beam and a reception beam detected by detector 26. Beam-shaping lens 27 is designed as a lens that reflects both the emitted laser beam as well as the reception beam reflected and/or scattered by target object 13. By means of beam-splitting lens 28, the laser beam coming from beam source 25 is spatially separated by the reflected and/or scattered reception beam.

Camera device 22 comprises an image sensor 33 and a camera lens 34. As an image sensor, any light-sensitive electronic component is suitable with which a digital image can be generated from a target object. For example, CCD sensors, CID sensors, and CMOS sensors are used as image sensors. Image sensors consist of an array of light-sensitive elements; the smallest unit of the image sensor is referred to as a pixel and for every pixel, the camera device provides a measurement value that is referred to as a pixel value. Every pixel of the image sensor corresponds to an image region in the image of the target object. The larger the surface of the pixel is, the higher the light sensitivity but the lower the image resolution. As depicted in FIG. 2, camera lens 34 may consist of a single lens or comprise multiple lenses, which are designed to be moveable in relation to each other. By means of a camera lens 34 with multiple lenses, the optical resolution of camera device 22 may be increased, wherein the stability is reduced by the moveable lenses.

Control device 23 comprises a control element 35 for controlling distance measurement apparatus 21 and camera device 22, an evaluation element 36 for evaluating the images taken by camera device 22, as well as a storage element 37 for storing preset parameters for the calibration procedure. Controlling camera device 22 and evaluating the images occurs by means of control device 23, which is connected via a communications link to camera device 22; alternatively, evaluation element 36 can be integrated in control device 23 and be connected via a communications link to control device 23. Control element 32 of distance measurement apparatus 21 is connected via a communications link to control device 23. In this design, controlling electrical-optical components 25, 26, and calculating the distance occur by means of control element 32; the control command to execute a distance measurement or to send out laser beam. 11 as a positioning beam is generated by control element 35. Alternatively, control element 32 can be integrated in control device 23.

Distance measurement apparatus 21 and camera device 22 must be precisely arranged to each other to reduce measurement errors in the measuring process. The optical axis of the laser beam is defined as measurement axis 38 of distance measurement apparatus 21 and the optical axis of camera lens 34 is defined as the target axis 39 of camera device 22. So that measurement axis 38 and target axis 39 are arranged coaxially to each other, there are arranged in device housing 24 a first and second deflection mirror 41, 42 that deflect the laser beam and the reception beam. Deflection mirrors 41, 42 are designed in a reflecting manner for the wavelength of the laser beam and the reception beam. The laser beam emerging from distance measurement apparatus 21 strikes first deflection mirror 41, which deflects the laser beam 90°. The deflected laser beam strikes second deflection mirror 42, which also deflects the laser beam 90°. Ideally, optical axis 38 of the twice-deflected laser beam runs only coaxially to optical axis 39 of camera device 22; in practice, measurement axis 38 and target axis 39 may be tilted to each other.

Figure 3:
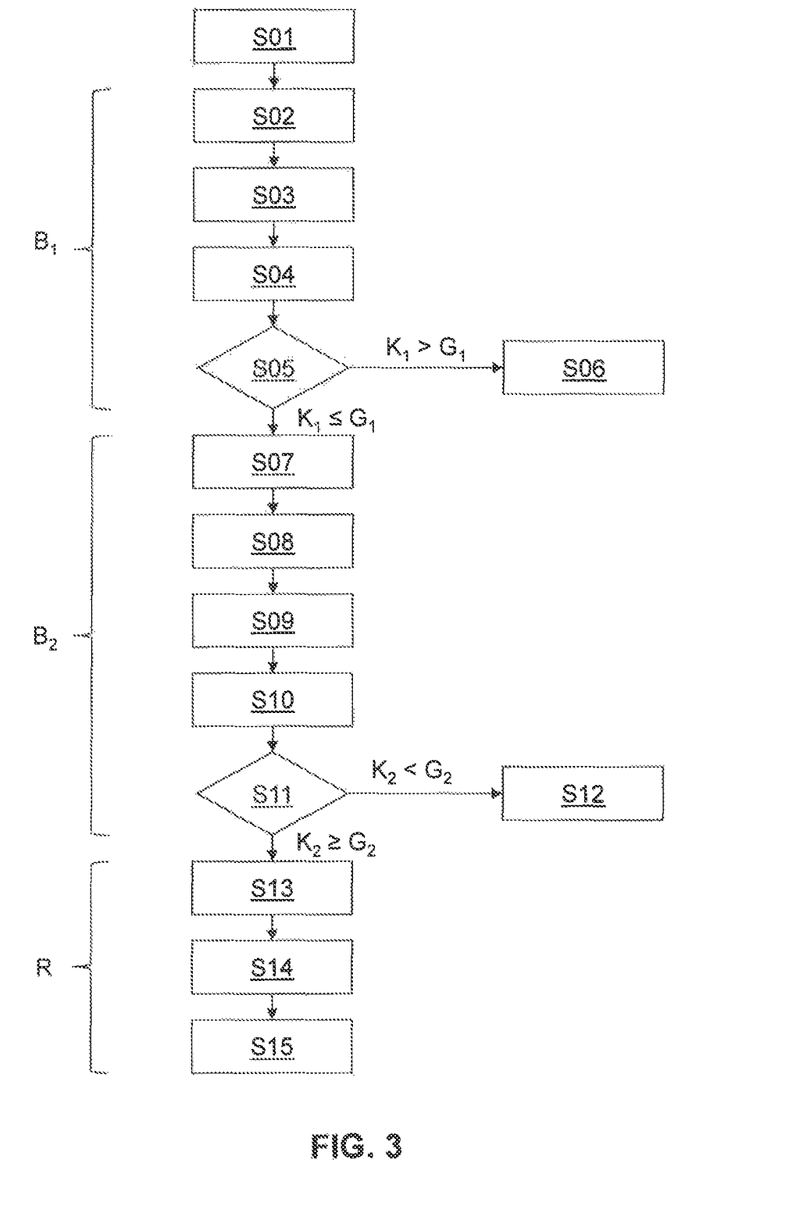
FIG. 3 depicts a design variant of the method according to the invention for calibrating a measurement device in a block diagram.

In a block diagram, FIG. 3 depicts a design variant of the method according to the invention for calibrating a measurement device by means of a target object. The method is explained using measurement device 10 as an example. The calibration of measurement device 10 occurs automatically and requires no intervention by an operator. The method according to the invention may be performed one time after turning on measurement device 10, after a preset time interval has elapsed, or after performing a preset number of measurements. In the design variant depicted in FIG. 3, measurement device 10 is to be calibrated after a preset number of measurements.

The position of target axis 39 of camera device 22 is measured by the device manufacturer and stored in storage element 37 as position coordinate $X_P$, $Y_P$. If camera device 22 uses camera lens 34 with two focal lengths f1, f2, the positions of target axis 39 can be measured for every focal length of camera device 22 and be stored as position coordinates $X_{P1}$, $Y_{P1}$ for first focal length $f_1$, and $X_{P2}$, $Y_{P2}$ can be stored for the second focal length f2 in storage element 37 of control device 23. Stored in storage element 37, the position of target axis 39 is superimposed in the current image of the target object that is depicted on image sensor 33, for example as crosshairs. The crosshairs are intended to make it easier for the operator to position the laser beam more accurately.

After measurement device 10 has performed the preset number of measurements, control element 35 of control device 23 switches measurement device 10 into a calibration mode in step S01. In the calibration mode, camera device 22 is directed at target object 13 and laser beam 11 of distance measurement apparatus 21 is turned off.

Figure 4A:
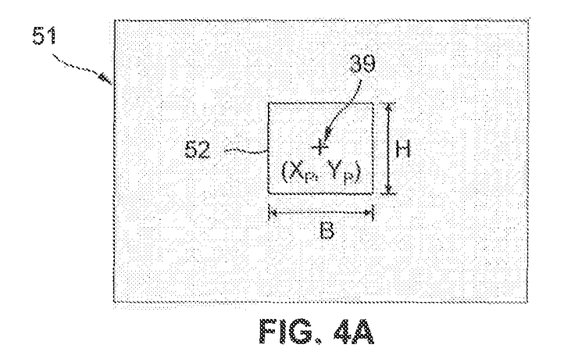
FIGS. 4A-C depict a first image of a target object with the laser beam turned off (FIG. 4A), a second image of the target object with the laser beam turned on (FIG. 4B), and a differential image between the first and second image (FIG. 4C)

In step S02, camera device 22 takes a first image 51 of target object 13, which is depicted schematically in FIG. 4A. Control element 35 generates a corresponding control command for image sensor 33, which stores first image 51 of target object 13 and transmits it to control device 23. In step S03, in the first image 51 of target object 13, an image section 52 is defined by means of evaluation element 36 about target axis 39 position coordinates $X_P$, $Y_P$ stored in storage element 37. The dimensions, height H and width B, of image section 52 are initially defined and also stored in storage element 37 of control device 23. The evaluation of first image 51 performed in step S03 takes place in control device 23 and is not shown to the operator.

In step S04 and for the pixels lying within image section 52, evaluation element 36 determines the respective luminous intensity and calculates a first contrast $K_1$ as the difference between 1 and the ratio of the luminous intensities between the darkest pixel $P_{1,min}$ of image section 52 and the brightest pixel $P_{1,max}$ of image section 52 according to the formula $K_1=(1-P_{1,min}/P_{1,max})*100\%$. A first contrast $K_1$ of 100% corresponds to a maximum difference in the luminous intensity, i.e., the darkest pixel $P_{1,min}$ has no luminous intensity and the brightest pixel $P_{1,max}$ has a maximum luminous intensity. Given a first contrast $K_1$ of 0%, there is no difference in the luminous intensity between the darkest pixel $P_{1,min}$ and the brightest pixel $P_{1,max}$, i.e., all pixels of image section 52 have the same luminous intensity.

In step S04, the first contrast $K_1$ is calculated from the luminous intensity ratio between the darkest pixel $P_{1,min}$ of image section 52 and the brightest pixel $P_{1,max}$ of image section 52. Alternatively, the pixel values of multiple neighboring pixels can be averaged and be used to calculate the first contrast $K_1$. "Image region" refers to the smallest unit of the images of the target object that are used for evaluating target object 13 within the scope of the method according to the invention. The image region may be an individual pixel or comprise multiple neighboring pixels, whose pixel values are averaged into one measurement value, wherein the pixel values can be weighted equally or variably in the averaging.

Calculated in step S04, first contrast $K_1$ of image section 52 is compared by evaluation element 36 in step S05 against a first limit value $G_1$. To limit the measurement error during calibration, target object 13 should have the most uniform brightness possible. First limit value $G_1$ is for example 5%, i.e., all pixels of image section 52 have a deviation of less than 5% to the brightest $P_{1,max}$. First limit value $G_1$ is established beforehand and stored in storage element 37 of control device 23. If first contrast $K_1$ of image section 52 exceeds first limit value $G_1$($K_1$>$G_1$), target object 13 is not suited for calibrating measurement device 10. In step S06, measurement device 10 is switched by control element 35 from the calibration mode into a measurement mode.

Figure 4B:
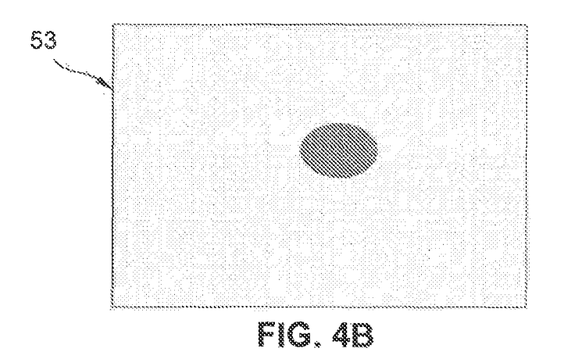
Figure 4C:
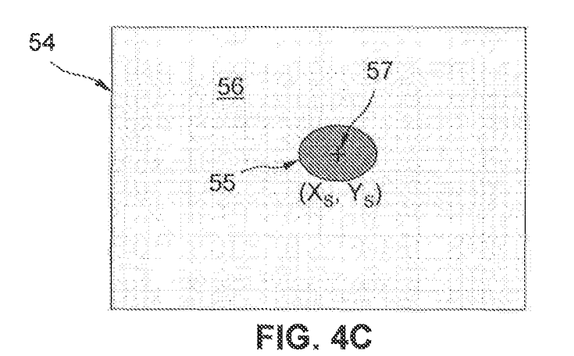

The method according to the invention is continued after step S05 only if first contrast $K_1$ of image section 52 does not exceed first limit value $G_1$($K_1$≤$G_1$). In step S07, camera device 22 takes a second image 53 of target object 13 with laser beam 11 turned on, which is depicted schematically in FIG. 4B. Control element 35 generates corresponding control commands for distance measuring apparatus 21 and camera device 22; image sensor 33 stores second image 53 of target object 13 and transmits it to control device 23. Evaluation element 36 determines in step S08 a differential image 54, depicted schematically in FIG. 4C, between the first and second image 51, 53 of target object 13. To compensate for brightness differences attributed to dirtying of image sensor 33, irregular sensitivity of the pixels, and so on, the first and second image 51, 53 of target object 13 can be processed prior to the evaluation for the method according to the invention with known image processing procedures, such as white-image or flat-field corrections. In differential image 54 of target object 13, a laser beam 55 and a surrounding region 56 are identified by means of evaluation element 36 in step S09. To do so, known object identification methods are used. In step S10, evaluation element 36 determines the luminous intensity of the individual pixels in differential image 54 for laser beam 55 and surrounding region 56, and calculates a second contrast $K_2$ as the difference between 1 and the ratio of the luminous intensities between the brightest pixel $P_{2,min}$ of the surrounding region 56 and the darkest pixel $P_{2,max}$ of laser beam 55 according to the formula $K_2=(1-P_{2,min}/P_{2,max})*100\%$. Similarly, as with the first contrast $K_1$, the pixel values of multiple neighboring pixels can be averaged in a measurement value and be used for calculating the second contrast $K_2$.

In step S11, second contrast $K_2$ calculated in step S10 is compared to a second limit value $G_2$ by means of evaluation element 36. To limit the measurement error during calibration, laser beam 55 should have a greater brightness compared to surrounding region 56. Second limit value $G_2$ is 10% for example, i.e., all pixels of laser beam 55 have an at least a 10% higher luminous intensity than the pixels of surrounding region 56. Second limit value $G_2$ is established beforehand and is stored in storage element 37 of control device 23. If the second contrast $K_2$ falls below second limit value $G_2$ ($K_2$<$G_2$), target object 13 is not suited for calibrating measurement device 10. Measurement device 10 is switched over by control element 35 in step S12 from the calibration mode into a measurement mode.

The method according to the invention is continued after step S11 only if second contrast $K_2$ does not fall below second limit value $G_2$ ($K_2$≥$G_2$). In step S13, evaluation element 36 determines a focus point 57 of laser beam 55 and the associated focus point coordinates $X_S$, $Y_S$. To do so, known object identification methods are used. Focus point coordinates $X_S$, $Y_S$ of laser beam 55 are stored in step S14 as a new position of target axis 39 for camera device 22 in storage element 37. Evaluation element 36 transmits focus point coordinates $X_S$, $Y_S$ to storage element 37, which stores focus point coordinates $X_P$, $Y_P$ as new position coordinates $X_S$, $Y_S$ of target axis 39. Measurement device 10 is switched by control element 35 in step S15 from the calibration mode into a measurement mode.

The method according to the invention depicted in FIG. 3 can be subdivided into three parts. In the steps S02 to S05, the uniformity in the brightness of target object 13 is inspected by means of first contrast $K_1$, which represents a first evaluation criterion for target object 13. Steps S02 to S05 are consolidated as a first evaluation part $B_1$. In steps S07 to S11, the difference in the brightness between laser beam 55 and surrounding region 56 is inspected using second contrast $K_2$, which represents a second evaluation criterion for target object 13. Steps S07 to S11 are consolidated as second evaluation part $B_2$. If target object 13 has passed the first and second evaluation parts $B_1$, $B_2$, the position of target axis 39 is determined in steps S13 to S15 and stored as a new position. Steps S13 to S14 are consolidated as calculation part R.

Figure 5:
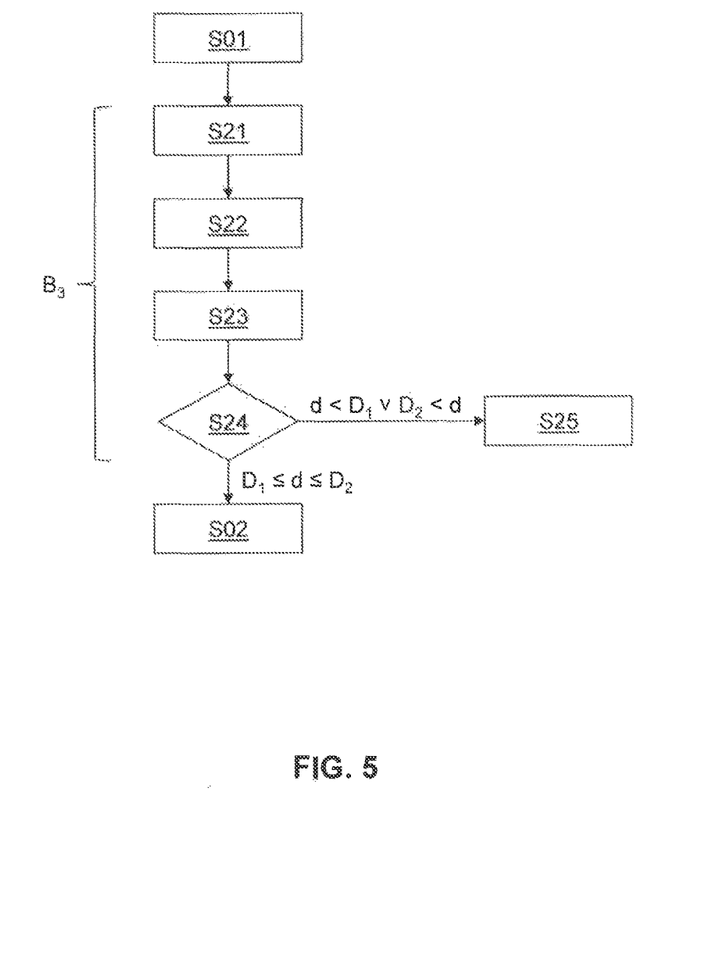
FIG. 5 depicts an additional design variant of the method according to the invention for calibrating a measurement device in a block diagram.

In a block diagram, FIG. 5 depicts an additional design variant of the method according to the invention for calibrating a measurement device by means of a target object. This design variant differs from the method of FIG. 3 in that, besides the first contrast $K_1$ and the second contrast $K_2$, an additional evaluation criterion is inspected for target object 13.

The distance of measurement device 10 to target object 13 is a third evaluation criterion that evaluates the quality of a target object for calibrating a measurement device. In a step S21, control element 35 generates a control command for the distance measurement apparatus 21. Distance measurement apparatus 21 measures in step S22 the distance d of measure device 10 to target object 13. Measured distance d is transmitted in step S23 by control element 32 to control device 23.

In a step S24, distance d is compared against a distance range ($D_1$, $D_2$) by means of evaluation element 36. To limit the measurement error during calibration, target object 13 should be arranged within distance range ($D_1$, $D_2$). For distances that lie above the distance range, there is a risk that the luminous intensity of the pixels within the laser beam is too low. Distance range ($D_1$, $D_2$) is established beforehand and stored in storage element 37 of control device 23. If distance d lies outside of the distance range (d<$D_1$ or d>$D_2$), target object 13 is not suited for calibrating measurement device 10. Measurement device 10 is switched over by control element 35 in step S25 from the calibration mode into a measurement mode. The method according to the invention is continued after step S24 only if the distance lies within the distance range ($D_1 \leq d \leq D_2$).

Steps S21 to S24 are consolidated as the third evaluation part $B_3$. The distance measurement (steps S21 to S23) and the comparison with the distance measurement range (step S24) can, as depicted in FIG. 5, be performed before camera device 22 takes the first image of target object 13 (Step S02). Alternatively, the third evaluation part $B_3$ can be performed after the first evaluation part $B_1$ or after the second evaluation part $B_2$.

The invention claimed is:

1. A method for calibrating a measurement device which includes a laser measurement apparatus, which emits a first laser beam along a measurement axis, a camera device with a target axis, and a control device, comprising the steps of:
    taking a first image of a target object by the camera device, with the first laser beam turned off;
    defining an image section about a position stored in the control device of the target axis in the first image of the target object;
    determining a first contrast between a darkest image region of the image section and a brightest image region of the image section;
    comparing the first contrast against a first limit value stored in the control device;
    determining that the first contrast does not exceed the first limit value, and subsequently taking a second image of the target object by the camera device with the first laser beam turned on;
    determining a differential image between the first image and the second image of the target object;
    identifying a second laser beam and a surrounding region in the differential image of the target object;
    determining a second contrast between a brightest image region of the surrounding region and a darkest image region of the second laser beam;
    comparing the second contrast against a second limit value stored in the control device;
    determining that the second contrast does not fall below the second limit value, and subsequently determining a focus point of the second laser beam and focus point coordinates; and
    storing the focus point coordinates of the second laser beam as a new position of the target axis in the control device.

2. The method according to claim 1, further comprising the steps of:
    performing a distance measurement to produce a measured distance to the target object; and
    comparing the measured distance against a distance range stored in the control device.

3. The method according to claim 1, wherein the camera device has a camera lens which is switchable between a first focal length and a second focal length, and further comprising the step of storing a first position of the target axis for the first focal length of the camera lens and a second position of the target axis for the second focal length of the camera lens by the control device.

4. The method according to claim 3, wherein the camera lens is switchable between more than two focal lengths, and further comprising the step of storing a position of the target axis for every focal length of the camera lens by the control device.

* * * * *